W. E. WINE.
HAND BRAKE MECHANISM.
APPLICATION FILED JAN. 19, 1918.
1,277,804.
Patented Sept. 3, 1918.
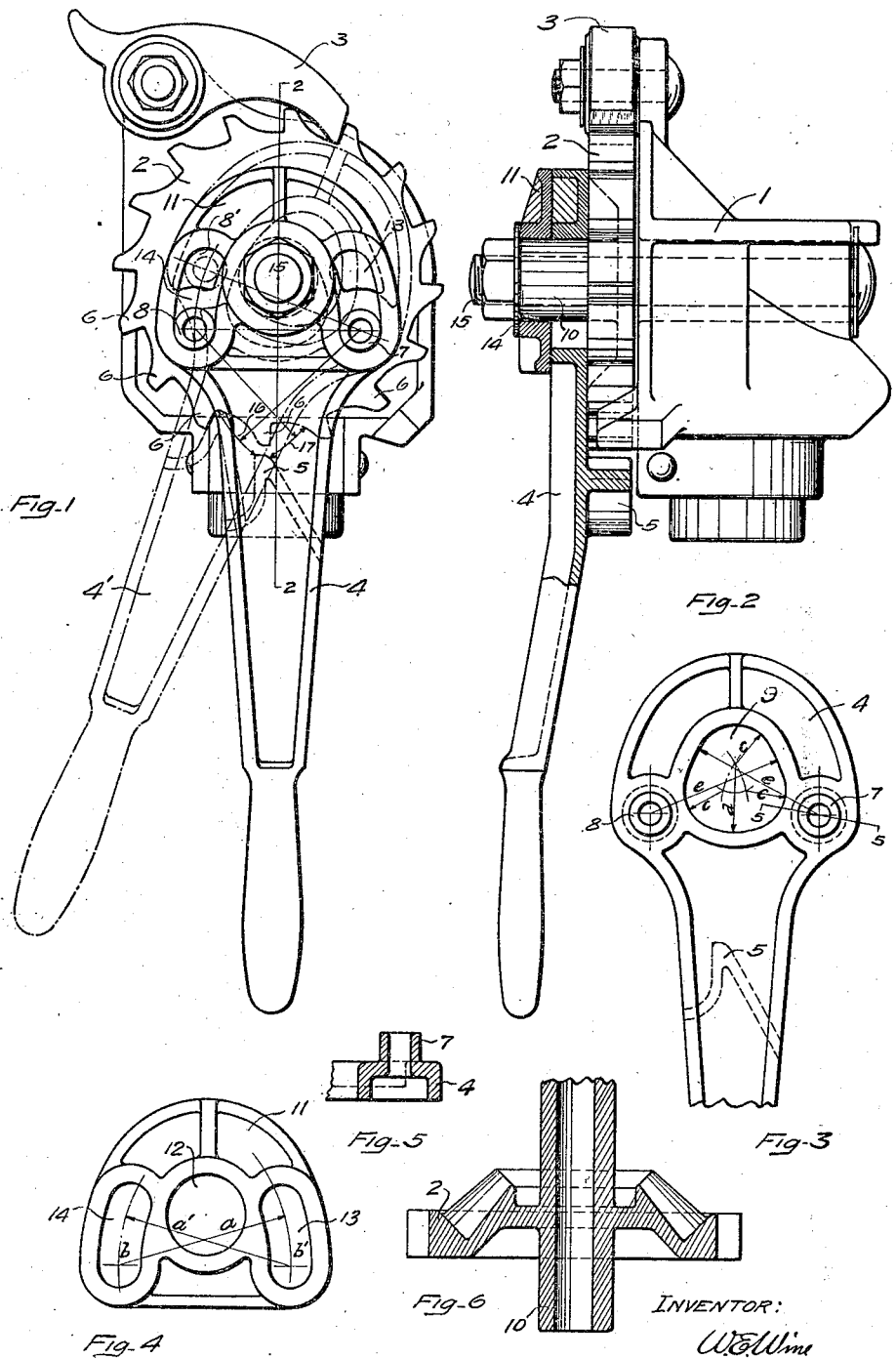

UNITED STATES PATENT OFFICE.

WILLIAM E. WINE, OF TOLEDO, OHIO.

HAND BRAKE MECHANISM.

1,277,804.  Specification of Letters Patent.  Patented Sept. 3, 1918.

Application filed January 19, 1918. Serial No. 212,619.

*To all whom it may concern:*

Be it known that I, WILLIAM E. WINE, a citizen of the United States, residing at Toledo, in the county of Lucas and the State of Ohio, have invented new and useful Improvements in Hand Brake Mechanisms, of which the following is a specification, reference being had to the accompanying drawings, forming a part thereof.

My invention relates to new and useful improvements in hand brake mechanisms for railway cars and has for its object to provide a means whereby the brakes can be applied and released in an efficient and simple manner.

With these and other objects in view, my invention consists of certain improvements, arrangement of parts and combination of elements as hereinafter described and claimed in the accompanying drawings.

Figure 1 is a front elevation showing the application of the device to a ratchet wheel of a brake operating device.

Fig. 2 is a side elevation of a brake operating device and a section on line 2—2 of that portion to which this application relates most specifically.

Fig. 3 is a partial front view of the part of the device which incorporates the handle.

Fig. 4 is a front view of a cam member which coöperates with the part shown in Fig. 3.

Fig. 5 is a section on line 5—5 of Fig. 3.

Fig. 6 is a partial section of the ratchet wheel on line 2—2.

Similar characters designate similar parts throughout the several figures of the drawing.

Referring now to the parts by number: The brake operating device 1 is provided with a ratchet wheel 2 and pawl 3. The ratchet wheel 2 is operated by a handle 4 which is provided with a lug 5 which is adapted to engage the teeth 6 on the ratchet wheel and to move same in either direction. The handle 4 is provided with an angular shaped orifice 9 which is adapted to engage the cylindrical hub portion 10 of the ratchet wheel 2.

The cam member 11 is provided with a bearing 12 which is adapted to engage the hub portion 10 of the ratchet wheel. The cam member 11 is also provided with slots 13 and 14 which are adapted to engage the lugs 7 and 8 respectively on the handle 4.

The ratchet wheel 2, handle 4 and cam member 11 are held in operative relation with brake operating mechanism by a washer 14 and bolt 15.

It will be seen by reference to Fig. 1, that a pull on the handle 4 will cause the top end of lug 5 to move along the line 16 into engagement with one of the teeth 6 of the ratchet wheel, the handle taking the position shown by 4′.

The handle 4 revolves about the trunnion 7 journaled in the bottom of slot 13, while the trunnion 8 moves upwardly to the top of slot 14 into positions shown by 8′. This movement if continued and repeated will apply the brakes through the medium of the brake operating mechanism.

In order to release the brakes, it is necessary to disengage the pawl 3 and to reverse the operation of handle 4 which will cause the lug 5 to move along line 17 into engagement with the opposite side of teeth 6 and upon further movement will cause the ratchet wheel to revolve in the opposite direction thereby releasing the brake.

In order that the lugs 7 and 8 may properly coöperate with the cam member 11, it is necessary that the slots 13 and 14 be properly formed, the slots 13 and 14 being parallel to arcs of circles with radii $a$ and $a'$ with centers $b$ and $b'$ respectively.

When the handle 4 is hanging in its normal position as shown in Fig. 1, the centers of trunnions 7 and 8 coincide with the centers $b'$ and $b$ respectively of the cam members and during their operation describe arcs about either of these centers coincident with the center lines of the slots 13 and 14.

With reference to Fig. 3, it will be observed that the orifice 9 is formed by arcs of circles having three different lengths of radii, viz., $c$, $d$ and $e$.

The radii $c$ are the same as that of the hub portion 10 of the ratchet wheel, while radii $e$ are of sufficient length to form arcs tangent to arcs struck with radii $c$ and centers coincident with centers of lugs 7 and 8.

The device as here shown applies to hand brake mechanism of the form shown in my copending application Serial No. 202,789, but it is entirely obvious that this operating means can be applied to other forms of ratchet brakes.

It will be understood from this description that although the improvements in this invention are simple, they accomplish in a thoroughly practical manner all the objects sought.

I wish it further understood that I do not desire to be limited to the specific construction of elements shown and described as it is obvious that changes in construction and arrangement may be made without departing from the spirit of the invention.

Having thus described my invention, I aim in the appended claims to cover all modifications which do not involve a departure from its spirit and scope.

What I claim as new and desire to secure by Letters Patent of the United States is:

1. A device for operating hand brakes, comprising a handle provided with a ratchet engaging member and a bearing adapted for pivotal and oscillatory engagement with a journal and pivotal means coöperating with said handle to move said ratchet engaging means into operating position.

2. A device for operating hand brakes, comprising a handle provided with a ratchet engaging member on one side and a trunnion on its opposite side and a cam member with a curved channel adapted for pivotal and oscillatory coöperation with said trunnion.

3. A device for operating hand brakes, comprising a handle provided with a ratchet engaging member on one side and eccentrically located trunnions on the opposite side and a cam member with curved channels adapted for pivotal and oscillatory coöperation with said trunnions, said handle and said cam member having gaging openings for the reception of a journal.

4. In a hand brake mechanism provided with a ratchet wheel, a cam member journaled concentric with said ratchet wheel, a handle pivoted to said cam member, and means on said handle for coöperating with said ratchet wheel to move it in opposite directions.

5. In a hand brake mechanism provided with a ratchet wheel, a cam member journaled concentric with said ratchet wheel and provided with a curved channel, a handle pivoted to said cam member, said handle being provided with a lug operating in said channel.

6. In a hand brake mechanism provided with a ratchet wheel, a cam member journaled concentric with said ratchet wheel and provided with a curved channel on each side thereof, a handle provided with lugs pivoted and operating in said channels.

7. In a hand brake mechanism provided with a ratchet wheel, means for operating said ratchet wheel comprising a handle provided with a lug adapted to engage the teeth of said ratchet wheel, a cam member pivotally coöperating with said handle to cause the lug to engage the teeth of said ratchet wheel, said handle being provided with a curved portion forming a bearing concentric with said ratchet wheel.

8. In a hand brake mechanism provided with a ratchet wheel, means for operating said ratchet wheel comprising a handle provided with a lug adapted to engage opposite sides of the teeth of said ratchet wheel, a cam member pivotally coöperating with said handle, said handle being provided with an opening in which the hub of said ratchet wheel operates.

This specification signed and witnessed this 10th day of January, 1918.

W. E. WINE.

In the presence of—
T. C. TILLMAN,
Jos. L. TILLMAN.

Copies of this patent may be obtained for five cents each, by addressing the "Commissioner of Patents, Washington, D. C."